US009611951B2

(12) United States Patent
Yoshimura

(10) Patent No.: US 9,611,951 B2
(45) Date of Patent: Apr. 4, 2017

(54) SOLENOID VALVE

(71) Applicant: Rinnai Corporation, Nagoya-shi, Aichi (JP)

(72) Inventor: Kimihiro Yoshimura, Nagoya (JP)

(73) Assignee: RINNAI CORPORATION, Nagoya-shi (JP)

( * ) Notice: Subject to any disclaimer, the term of this patent is extended or adjusted under 35 U.S.C. 154(b) by 29 days.

(21) Appl. No.: 14/841,974

(22) Filed: Sep. 1, 2015

(65) Prior Publication Data

US 2016/0084399 A1    Mar. 24, 2016

(30) Foreign Application Priority Data

Sep. 22, 2014   (JP) ................................. 2014-192182

(51) Int. Cl.
   *F16K 31/06*    (2006.01)
   *F16K 1/36*    (2006.01)
   (Continued)

(52) U.S. Cl.
   CPC ............ *F16K 31/0655* (2013.01); *F16K 1/36* (2013.01); *F16K 27/029* (2013.01); *H01F 3/00* (2013.01)

(58) Field of Classification Search
   CPC ...... F16K 31/0655; F16K 27/029; F16K 1/36; H01F 3/00
   (Continued)

(56) References Cited

U.S. PATENT DOCUMENTS 5,156,341 A * 10/1992 Terakado ........... F02M 51/0675
                                                         239/585.4
5,927,613 A *  7/1999 Koyanagi .......... F02M 51/0614
                                                         239/585.1
(Continued)

FOREIGN PATENT DOCUMENTS

JP         59-94674 U     6/1984
JP         03-119684 U   12/1991
(Continued)

OTHER PUBLICATIONS

Office Action dated Jul. 19, 2016, issued in counterpart Japanese Patent Application No. 2014-192182, with English translation. (6 pages).

*Primary Examiner* — John Bastianelli
(74) *Attorney, Agent, or Firm* — Westerman, Hattori, Daniels & Adrian LLP

(57) ABSTRACT

A solenoid valve has: a valve body; a moving core with a valve body on one end; a guide tube slidably enclosing the moving core; a stationary core disposed in an inner circumference of an opposite end portion of the guide tube so as to face an opposite end of the moving core; a valve spring to urge the moving core in a direction away from the stationary core; an electromagnetic coil disposed to enclose the guide tube; and a magnetic plate disposed on an opposite end of the guide tube having a caulked portion. The guide tube has a caulked portion formed to fix in position the stationary core by engagement of the caulked portion with a recessed groove formed on an outer periphery of the stationary core. When the stationary core is fixed in position by the caulked portion, that surface of the stationary core which faces the magnetic plate is either flush with, or is protruding beyond, the opposite end of the guide tube.

2 Claims, 3 Drawing Sheets

(51) Int. Cl.
*H01F 3/00* (2006.01)
*F16K 27/02* (2006.01)

(58) Field of Classification Search
USPC .............................. 251/129.15; 335/281, 297
See application file for complete search history.

(56) References Cited

U.S. PATENT DOCUMENTS

| | | | | |
|---|---|---|---|---|
| 5,950,932 | A * | 9/1999 | Takeda | F02M 51/0671 239/585.1 |
| 6,003,839 | A * | 12/1999 | Kobayashi | F02M 25/0836 251/129.15 |
| 6,390,443 | B1 * | 5/2002 | Katayama | B60T 8/3615 251/129.15 |
| 7,032,879 | B2 * | 4/2006 | Hayashi | F16K 31/0679 251/129.09 |
| 2004/0021109 | A1 * | 2/2004 | Okuda | F16K 31/0689 251/86 |
| 2007/0158604 | A1 * | 7/2007 | Kondo | F16K 31/061 251/129.15 |
| 2012/0223264 | A1 * | 9/2012 | Doerr | F16K 31/0682 251/129.15 |

FOREIGN PATENT DOCUMENTS

| | | |
|---|---|---|
| JP | 2002-188745 A | 7/2002 |
| JP | 2010-164104 A | 7/2010 |

\* cited by examiner

SOLENOID VALVE

BACKGROUND OF THE INVENTION

1. Technical Field

The present invention relates to a solenoid valve for use mainly in a combustion apparatus.

2. Background Art

This kind of solenoid valve is conventionally provided with: a valve body; a moving core having connected to one end thereof the valve body; a guide tube having slidably inserted thereinto the moving core; a stationary core disposed in an inner periphery of an opposite end portion of the guide tube so as to face an opposite end of the moving core; a valve spring to urge (press or force) the moving core in a direction away from the stationary core; an electromagnetic coil disposed to enclose the guide tube; and a magnetic plate disposed on the opposite end of the guide tube, whereby the moving core is sucked to the stationary core by a magnetic force transmitted through the magnetic plate to the stationary core due to electric charging to the electromagnetic coil.

In order to enable to efficiently transmit the magnetic force from the magnetic plate to the stationary core, it is necessary to bring the surface of the stationary core, said surface lying opposite to (or facing) the magnetic plate, into contact with the magnetic plate. The surface in question is hereinafter also called "that surface of the stationary core which faces the magnetic plate." This expression of "that . . . which" will make it clear that it is the "surface" (not the "stationary core") that faces or lies opposite to the magnetic plate. As a solution, conventionally there is formed, in a part of that surface of the stationary core which faces the magnetic plate, a projection to penetrate through a perforation (through hole) that is formed in the magnetic plate. Such a tip portion of the projection as is protruding through the perforation is thereafter caulked so as to bring that surface of the stationary core which faces the magnetic plate into contact with the magnetic plate (see, for example, JP-A-2010-164104).

In this conventional example, however, the magnetic plate is pushed toward the electromagnetic coil when the tip portion of the projection is caulked. As a consequence, in case the caulking force is excessive, an undue compression load will be applied to the electromagnetic coil. There is therefore a possibility that a bobbin of the electromagnetic coil gives rise to deformation.

SUMMARY

Problems that the Invention is to Solve

In view of the above points, this invention has a problem of providing a solenoid valve which is capable of bringing that surface of the stationary core which faces the magnetic plate into abutment with the magnetic plate without causing an undue compression load to operate on the electromagnetic coil.

Means for Solving the Problems

In order to solve the above-described problems, there is provided a solenoid valve comprising: a valve body; a moving core having connected to one end thereof the valve body; a guide tube having slidably inserted thereinto the moving core; a stationary core disposed in an inner circumference of an opposite end portion of the guide tube so as to face an opposite end of the moving core; a valve spring to urge the moving core in a direction away from the stationary core; an electromagnetic coil disposed to enclose the guide tube; and a magnetic plate disposed on the opposite end of the guide tube, whereby the moving core is sucked to the stationary core by a magnetic force transmitted through the magnetic plate to the stationary core due to electric charging to the electromagnetic coil. The guide tube has a caulked portion formed to fix in position the stationary core by engaging the caulked portion with a recessed groove formed on an outer periphery of the stationary core such that, in a state in which the stationary core is fixed in position by the caulked portion, that surface of the stationary core which faces the magnetic plate is either flush with, or is protruding beyond, the opposite end of the guide tube, whereby, by thus disposing the magnetic plate on the opposite end of the guide tube, that surface of the stationary core which faces the magnetic plate is in contact with the magnetic plate.

According to this invention, the stationary core is fixed in position to the guide tube. As a result, by disposing the magnetic plate on the opposite end of the guide tube, that surface of the stationary core which faces the magnetic plate and which is either flush with, or is protruding beyond, the opposite end of the guide tube is in contact with the magnetic plate. Therefore, unlike an example in which caulking is made to force the magnetic plate toward the electromagnetic coil, that surface of the stationary core which faces the magnetic plate can be contacted with the magnetic plate without causing an undue compression load on the electromagnetic coil.

Further, in this invention, the solenoid valve preferably comprises: a projection disposed in a protruding manner so as to be inserted into a through hole formed in the magnetic plate, the projection being formed in a part of that surface of the stationary core which faces the magnetic plate; and a spring interposed between a spring stopper formed at a tip portion of the projection that protrudes beyond the through hole, and the magnetic plate, such that an urging force of the spring maintains that surface of the stationary core which faces the magnetic plate in a state of being in contact with the magnetic plate. According to this arrangement, even if a force is applied to the guide tube to bring that surface of the stationary core which faces the magnetic plate away from the magnetic plate at the time of assembling the solenoid valve, that surface of the stationary core which faces the magnetic plate will not be leaving away from the magnetic plate as long as the urging force of the spring is stronger than the above-described force applied to the guide tube. This brings about an improvement in reliability.

DESCRIPTION OF PREFERRED EMBODIMENTS

Figure 1:
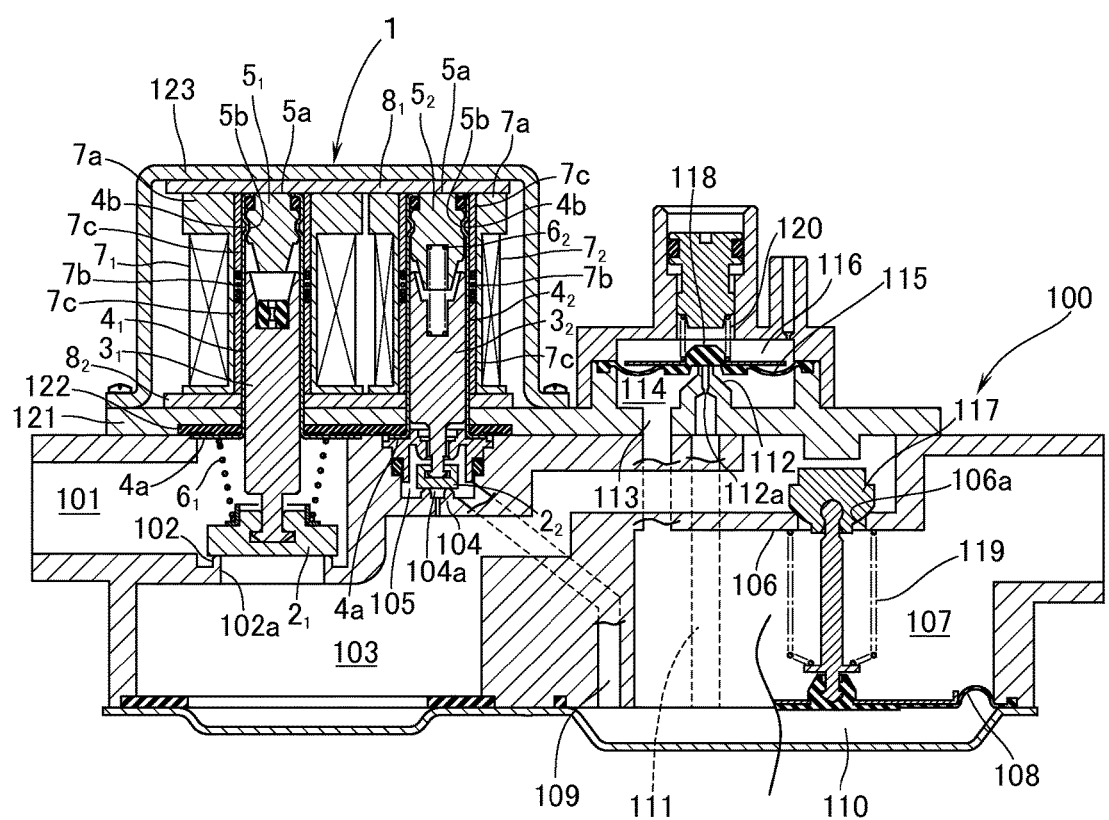
FIG. 1 is a sectional view of a zero-governor in which is built a solenoid valve according to a first embodiment of this invention.

With reference to FIG. 1, reference numeral 1 denotes a dual plunger solenoid valve which is a solenoid valve according to this invention. The dual plunger solenoid valve is built into a zero governor 100 which is interposed in a gas supply passage to a burner. The zero governor 100 is provided with an inlet chamber 101; an intermediate chamber 103 which is partitioned by a first valve seat 102 from the inlet chamber 101; a first pressure chamber 105 which is partitioned by a second valve seat 104 from the intermediate chamber 103; an outlet chamber 107 which is partitioned by a third valve seat 106 from the intermediate chamber 103; a second pressure chamber 110 which is partitioned by a first diaphragm 108 from the outlet chamber 107 and which comes into communication with the first pressure chamber 105 through a flow communication path 109; a third pressure chamber 114 which is partitioned by a fourth valve seat 112 from a flow communication path 111 which is in communication with the second pressure chamber 110, and which comes into communication with the outlet chamber 107 through a flow communication path 113 and also which comes into communication with the first pressure chamber 105 through a flow communication path (not illustrated); an atmospheric-pressure chamber 118 which is partitioned by a second diaphragm 115 from the third pressure chamber 114; a first valve body $2_1$ of the dual plunger solenoid valve 1 which opens or closes a first valve hole 102a which is formed in the first valve seat 102; a second valve body $2_2$ of the dual plunger solenoid valve 1 which opens or closes a second valve hole 104a which is formed in the second valve seat 104; a first diaphragm valve 117 which is connected to the first diaphragm 108 to open or close a third valve hole 108a which is formed in a third valve seat 106; a second diaphragm valve 118 which is connected to the second diaphragm 115 to open or close a fourth valve hole 112a which is formed in a fourth valve seat 112; a first spring 119 which urges (or presses) the first diaphragm valve 117 toward a downward closing side; and a second spring 120 which urges the second diaphragm valve 118 toward a downward closing side. Then, when the first and the second valve bodies $2_1$, $2_2$ are both made to be the valve-open states, gas flows, as in the conventional manner, from the inlet chamber 101 to the outlet chamber 107. Even if the gas pressure (primary pressure) in the inlet chamber 101 varies, the gas pressure (secondary pressure) in the outlet chamber 107 can be maintained at the atmospheric pressure.

Figure 2:
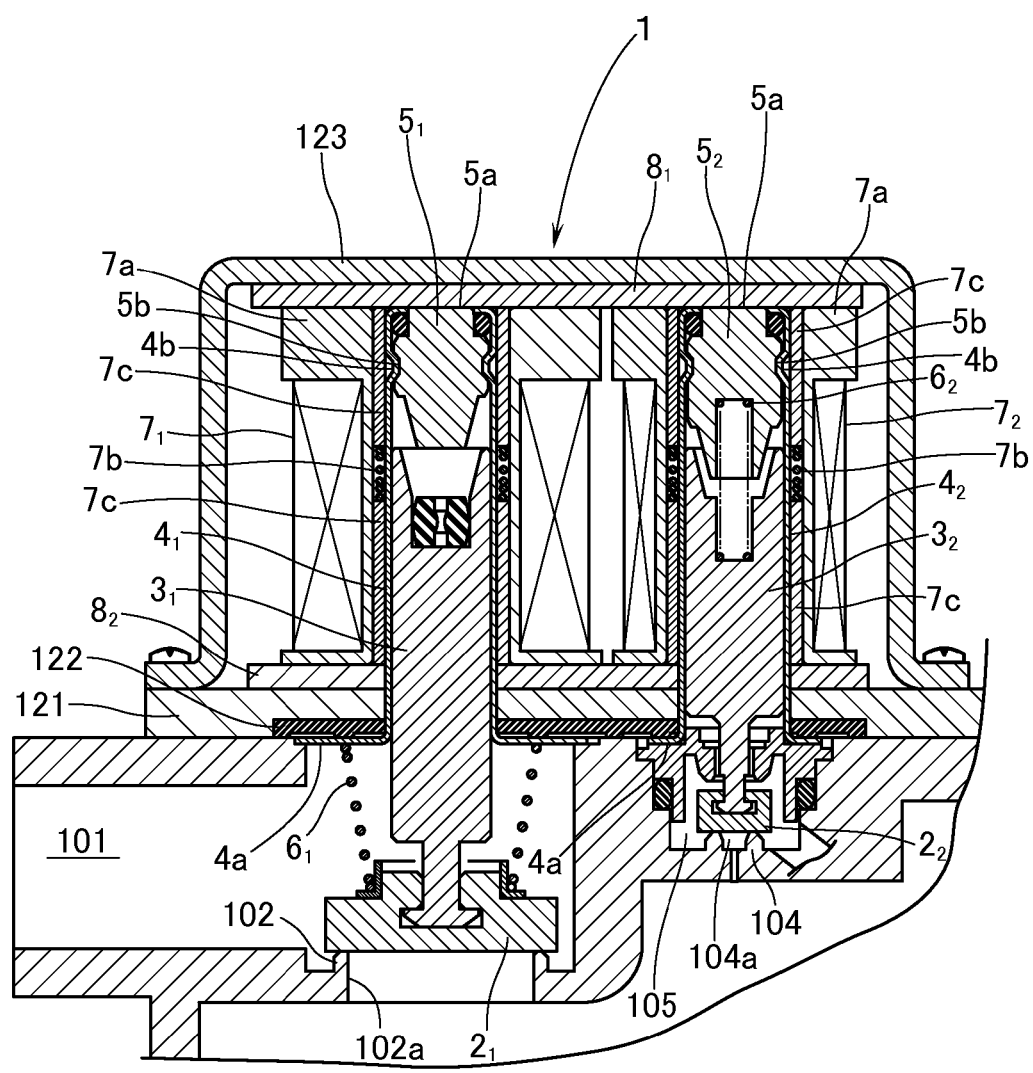
FIG. 2 is an enlarged sectional view of the solenoid valve shown in FIG. 1.

With reference also to FIG. 2, the dual plunger solenoid valve 1 is provided with: the first and the second valve bodies $2_1$, $2_2$; first and second moving cores $3_1$, $3_2$ each having connected to one end (lower end) thereof the first and the second valve bodies $2_1$, $2_2$; first and second tubes $4_1$, $4_2$ which have slidably inserted thereinto the first and the second moving cores $3_1$, $3_2$, respectively; first and second stationary cores $5_1$, $5_2$ which are disposed on an inner circumference at an upper end of the first and the second guide tube tubes $4_1$, $4_2$ in a manner to lie opposite to the other end (upper end) of the first and the second moving cores $3_1$, $3_2$, respectively; and first and second valve springs $6_1$, $6_2$ which respectively push the first and the second moving cores $3_1$, $3_2$ in a direction away from the stationary cores 5, $5_2$. The first and the second valve bodies $2_1$, $2_2$ are of a normally-closed type in which the first and the second valve bodies $2_1$, $2_2$ are urged by the first and the second valve springs $6_1$, $6_2$, respectively, toward a closing position to close the first and the second valve holes 102a, 104a.

The dual plunger solenoid valve 1 is further provided with: first and second electromagnetic coils $7_1$, $7_2$ which are disposed so as to enclose the first and the second guide tubes $4_1$, $4_2$, respectively; a first magnetic plate $8_1$ which is disposed on the upper end of the first and the second guide tubes $4_1$, $4_2$ so as to bridge over the first and the second guide tubes $4_1$, $4_2$; and a second magnetic plate $8_2$ which is disposed on the lower end of the first and the second guide tubes $4_1$, $4_2$ so as to bridge over the guide tubes $4_1$, $4_2$. Ordinarily, it is normal practice to provide a magnetic side plate which connects together the first and the second magnetic plates $8_1$, $8_2$. In this embodiment, however, the magnetic side plate is omitted and an arrangement has been made that a common magnetic path is formed from the first moving core $3_1$ through the first stationary core $5_1$, the first magnetic plate $8_1$ the second stationary core $5_2$, the second moving core $3_2$, and the second magnetic plate 82 back to the first moving core $3_1$. When electric currents that are opposite to each other in flow direction are caused to flow through the first electromagnetic coil $7_1$ and the second electromagnetic coil $7_2$, the first and the second moving cores $3_1$, $3_2$ are caused to be sucked to the first and the second stationary cores $5_1$, $5_2$ by means of the magnetic forces to be transmitted through the fit magnetic plate $8_1$ to the first and the second stationary cores $5_1$, $5_2$. Thereafter, only by causing the electric current to flow only through one of the first electromagnetic coil $7_1$ and the second electromagnetic coil $7_2$, e.g., only through the first electromagnetic coil $7_1$, there can be maintained a state in which the first and the second moving cores $3_1$, $3_2$ get sucked to the first and the second stationary cores $5_1$, $5_2$, i.e., there can be maintained a state in which the first and the second valve bodies $2_1$, $2_2$ are kept open. Energy saving can thus be attained.

In addition, the second magnetic plate $8_2$ is disposed on a cover plate 121 that, is mounted on an upper surface of the zero governor 100. The lower end portions of the first and the second guide tubes $4_1$, $4_2$ are arranged to be penetrated through the second magnetic plate $8_2$ and the cover plate 121. Flange portion 4a is formed at the lower end of the first and the second guide tubes $4_1$, $4_2$, respectively. A packing 122 on the bottom surface of the cover plate 121 is then brought into close contact with the upper surface of the flange portion 4a, thereby securing good sealing property. The above-described first valve spring $6_1$ is interposed between the flange portion 4a at the lower end of the first guide tube $4_1$ and the first valve body $2_1$. The second valve spring $6_2$ is interposed between the second stationary core $5_2$ and the second moving core $2_2$. Further, between a bobbin 7a of the first and the second. electromagnetic coils $7_1$, $7_2$ and the first and the second guide tubes $4_1$, $4_2$, a pair of upper and lower collars 7c, 7c are inserted.

By the way, in order to make the magnetic forces to be efficiently transmitted between the first magnetic plate $8_1$ and the first and the second stationary cores $5_1$, $5_2$, the surface 5a that is on the upper. end of the stationary cores $5_1$, $5_2$, respectively, and that faces (or lies opposite to) the first magnetic plate $8_1$ (i.e., that surface of the stationary core which faces the magnetic plate) must be brought into contact with the first magnetic plate $8_1$. In case that surface 5a of the respective stationary cores $5_1$, $5_2$ which faces the magnetic plate $8_1$ is brought into contact with the first magnetic plate $8_1$ by caulking a projection that is formed in the stationary core $5_1$, $5_2$ in a projecting manner like in the conventional way, the first magnetic plate $8_1$ will be pushed or forced, at the time of calking, toward each of the first and the second electromagnetic coils $7_1$, $7_2$. When caulking is excessive, an undue compression load will be applied to the electromagnetic coils $7_1$, $7_2$. There is, therefore, a possibility that the bobbins 7a of the electromagnetic coils $7_1$, $7_2$ are deformed.

As a solution, the following arrangement has been employed in this embodiment. In other words, a caulked portion 4b is formed in the first and the second guide tubes $4_1$, $4_2$, respectively, so as to be in engagement with a recessed groove 5b that is formed on an outer periphery of the first and the second stationary cores $5_1$, $5_2$, respectively, thereby fixing in position the stationary cores $5_1$, $5_2$. It is thus so arranged that, in a state in which the stationary cores $5_1$, $5_2$ are fixed in position by the caulked portion $4b$, that surface, of the stationary core $5_1$, $5_2$ which faces the magnetic plate $8_1$, respectively, becomes flush (or on the same line) with the upper end of the guide tubes $4_1$, $4_2$. By disposing the first magnetic plate $8_1$ on the upper end of the guide tubes $4_1$, $4_2$, that surface $5a$ of the stationary core $5_1$, $5_2$ which faces the magnetic plate $8_1$ is, respectively, brought into contact with the first magnetic plate $8_1$. Alternatively, it may also be so arranged that, in a state in which the stationary cores $5_1$, $5_2$ are fixed in position by the caulked portion $4b$, that surface $5a$ of the stationary core $5_1$, $5_2$ which faces the magnetic plate $8_1$, respectively, projects or protrudes beyond the upper ends of the guide tubes $4_1$, $4_2$ to a certain degree. The first magnetic plate $8_1$ is pushed downward from an upper side by means of an inverse U-shaped push plate 123 to be mounted on the cover plate 121.

According to this arrangement, the first and the second stationary cores $5_1$, $5_2$ is fixed to the guide tubes $4_1$, $4_2$, respectively. Therefore, as long as the first magnetic plate $8_1$ is disposed on the upper end of the guide tube $4_1$, $4_2$, that surface $5a$ of the stationary core $5_1$, $5_2$ which faces the magnetic plate $8_1$ and which is flush with the upper end of the guide tube $4_1$, $4_2$ or is protruding therefrom, is brought into contact with the first magnetic plate $8_1$. Therefore, unlike a caulking practice in which the first magnetic plate $8_1$ is pushed toward the electromagnetic coils $7_1$, $7_2$, that surface $5a$ of the of the stationary cores $5_1$, $5_2$ which faces the magnetic plate $8_1$ can be brought into contact with the first magnetic plate $8_1$ without applying an undue compression load to the electromagnetic coils $7_1$, $7_2$.

However, in case the flange portion $4a$ of the first and the second guide tubes $4_1$, $4_2$ is deflected downward due to compression reaction force of the packing 122, the guide tubes $4_1$, $4_2$ will be deviated downward. As a result, that surface $5a$ of the stationary core $5_1$, $5_2$ which faces the magnetic plate $8_1$ of the stationary cores $5_1$, $5_2$ will be away from the first magnetic plate $8_1$.

Figure 3:
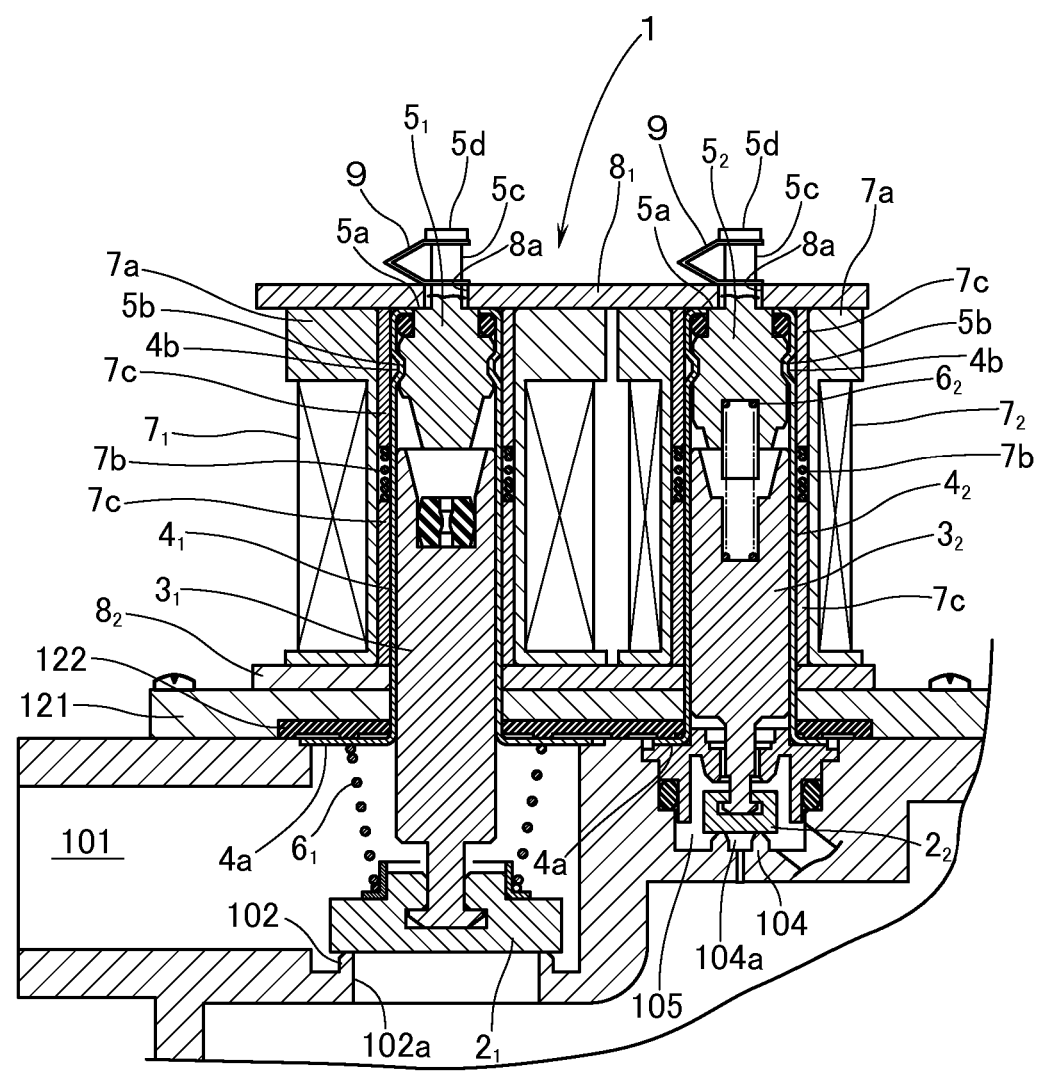
FIG. 3 is a sectional view of a solenoid valve according to a second embodiment of this invention.

Description will now be made of a second embodiment, as shown in FIG. 3, in which the above-mentioned disadvantage has been eliminated. Since the basic construction of the second embodiment is not particularly different from that of the first embodiment, the same reference numerals are assigned to the similar parts or members. The difference of the second embodiment from the first embodiment is as follows.

In other words, according to the second embodiment, a projection $5c$ which is inserted into a perforation $8a$ formed in the first magnetic plate $8_1$ is formed on a part of that surface $5a$ of the first and the second stationary core $5_1$, $5_2$ which faces the magnetic plate $8_1$ in a projecting manner. A spring stopper (spring receiving portion) $5d$ is disposed at a tip portion (upper end portion) of the projection $5c$ that protrudes beyond the perforation $8a$. A spring 9 is then interposed between the spring stopper $5d$ and the first magnetic plate $8_1$ so that the stationary cores $5_1$, $5_2$ are pushed upward against the first magnetic plate $8_1$. In the example as shown in FIG. 3, a plate spring is used as the spring 9, but a coil spring may be used. Further, a spring stopper $5d$ is formed by a flange portion that is integrally formed in the projection $5c$, but the spring stopper $5d$ may alternatively be formed by a snap ring which is attached to the tip portion of the projection $5c$.

According to the second embodiment, by adjusting the urging force of the spring 9 to a strength enough to prevent, the flange portion $4a$ from deflecting downward due to the compression reaction force of the packing 122, the guide tubes $4_1$, $4_2$ can be prevented from deviating downward. Therefore, that surface $5a$ of the first and the second stationary core $5_1$, $5_2$ which faces the magnetic plate $8_1$, can be maintained by the urging force of the spring 9 to the state of being in contact with the first magnetic plate $8_1$.

Descriptions have so far been made of the embodiments of this invention, but this invention shall not be limited to the above. For example, although the solenoid valve according to the above-described embodiments is a dual guide solenoid valve 1 for use in a zero-governor 100, this invention can also be applied to a dual plunger solenoid valve for other uses, or to a solenoid valve having a single valve body. Further, in the above-described embodiments, side plates for connecting the first magnetic plate $8_1$ and the second magnetic plate $8_2$ are omitted. This invention can also be applied to a solenoid valve having magnetic side plates.

EXPLANATION OF REFERENCE MARKS 1 dual plunger solenoid valve (solenoid valve)
$2_1$, $2_2$ valve body
$3_1$, $3_2$ moving core
$4_1$, $4_2$ guide tube
$4b$ caulked portion
$5_1$, $5_2$ stationary core
$5a$ that surface of the stationary core which faces the magnetic plate (i.e., the surface of the stationary core, said surface lying opposite to, or facing, the magnetic plate)
$5b$ recessed groove,
$5c$ projection
$5d$ spring stopper (spring receiving portion)
$6_1$, $6_2$ valve spring
$7_1$, $7_2$ electromagnetic coil
$8_1$ first magnetic plate (magnetic plate)
9 spring

What is claimed is:
1. A solenoid valve comprising:
a valve body;
a moving core having connected to one end thereof the valve body;
a guide tube having slidably inserted thereinto the moving core;
a stationary core disposed in an inner circumference of an opposite end portion of the guide tube so as to face an opposite end of the moving core;
a valve spring to urge the moving core in a direction away from the stationary core;
an electromagnetic coil disposed to enclose the guide tube; and
a magnetic plate disposed on the opposite end of the guide tube, whereby the moving core is sucked to the stationary core by a magnetic force transmitted through the magnetic plate to the stationary core due to electric charging to the electromagnetic coil,
wherein the guide tube has a caulked portion formed to fix in position the stationary core by engaging the caulked portion with a recessed groove formed on an outer periphery of the stationary core such that, in a state in which the stationary core is fixed in position by the caulked portion, that surface of the stationary core which faces the magnetic plate is either flush with, or is protruding beyond, the opposite end of the guide tube,
whereby, by thus disposing the magnetic plate on the opposite end of the guide tube, that surface of the stationary core which faces the magnetic plate is in contact with the magnetic plate.

2. The solenoid valve according to claim 1, further comprising:
a projection disposed in a protruding manner so as to be inserted into a through hole formed in the magnetic plate, the projection being formed in a part of that surface of the stationary core which faces the magnetic plate; and
a spring interposed between a spring stopper formed at a tip portion of the projection that protrudes beyond the through hole, and the magnetic plate, such that an urging force of the spring maintains that surface of the stationary core which faces the magnetic plate in a state of being in contact with the magnetic plate.

* * * * *